(12) United States Patent
Chaney et al.

(10) Patent No.: US 8,677,724 B2
(45) Date of Patent: Mar. 25, 2014

(54) ROUND BALER FOR BALING CROP RESIDUE

(75) Inventors: Mark M Chaney, Geneseo, IL (US); Stephen Michael Patton, Rock Island, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/097,726

(22) Filed: Apr. 29, 2011

(65) Prior Publication Data

US 2012/0096827 A1    Apr. 26, 2012

Related U.S. Application Data

(60) Provisional application No. 61/406,574, filed on Oct. 25, 2010.

(51) Int. Cl.
*A01D 75/00* (2006.01)

(52) U.S. Cl.
USPC .......................................................... 56/341

(58) Field of Classification Search
USPC ................... 56/341, 343, 361; 100/40, 78, 5
See application file for complete search history.

(56) References Cited

U.S. PATENT DOCUMENTS

| | | | |
|---|---|---|---|
| 2,096,990 A | 10/1937 | Luebben | |
| 2,147,469 A | 2/1939 | Tallman | |
| 3,665,690 A | 5/1972 | Wenger | |
| 3,839,852 A | 10/1974 | Jebens | |
| 3,901,008 A | 8/1975 | Taylor et al. | |
| 4,669,257 A * | 6/1987 | Rossato et al. | 56/341 |
| 4,910,949 A * | 3/1990 | Meyer | 56/341 |
| 5,203,153 A * | 4/1993 | Van Zee et al. | 56/341 |
| 6,366,210 B2 * | 4/2002 | Lemke | 340/665 |
| 6,421,992 B1 | 7/2002 | Goering et al. | |
| 6,421,996 B1 | 7/2002 | Deutsch et al. | |
| 6,477,824 B2 * | 11/2002 | Preheim | 56/341 |
| 6,591,743 B2 | 7/2003 | Deutsch et al. | |
| 6,681,552 B2 | 1/2004 | Nelson et al. | |
| 6,928,797 B1 | 8/2005 | Brantley | |
| 7,406,445 B1 * | 7/2008 | Silverbrook et al. | 705/42 |
| 7,490,544 B1 | 2/2009 | Bollinger et al. | |
| 7,918,158 B2 * | 4/2011 | Viaud | 100/45 |
| 2003/0093979 A1 | 5/2003 | Fukumori et al. | |
| 2006/0016166 A1 * | 1/2006 | Dubois | 56/341 |
| 2008/0141639 A1 * | 6/2008 | Shields | 56/14.6 |
| 2008/0271428 A1 * | 11/2008 | Rempe et al. | 56/341 |
| 2010/0063690 A1 * | 3/2010 | Madsen | 701/50 |
| 2010/0326292 A1 * | 12/2010 | Dillon | 100/2 |
| 2011/0023435 A1 | 2/2011 | Matousek et al. | |
| 2011/0023436 A1 | 2/2011 | Matousek et al. | |
| 2011/0023437 A1 | 2/2011 | Kendrick et al. | |
| 2011/0023438 A1 | 2/2011 | Matousek et al. | |
| 2011/0023439 A1 | 2/2011 | Kendrick et al. | |
| 2011/0023440 A1 | 2/2011 | Matousek et al. | |
| 2011/0023441 A1 * | 2/2011 | Herron et al. | 56/341 |
| 2011/0023442 A1 | 2/2011 | Herron et al. | |
| 2011/0023731 A1 | 2/2011 | Matousek et al. | |
| 2011/0023732 A1 | 2/2011 | Herron | |
| 2011/0024538 A1 | 2/2011 | Matousek et al. | |
| 2011/0029909 A1 | 2/2011 | Matousek et al. | |
| 2011/0053385 A1 * | 3/2011 | Smith et al. | 439/35 |
| 2011/0099966 A1 * | 5/2011 | Kraus | 56/341 |
| 2011/0191001 A1 * | 8/2011 | Viaud | 701/99 |

* cited by examiner

*Primary Examiner* — Thomas B Will
*Assistant Examiner* — Mai Nguyen (57) ABSTRACT

A method of converting a conventional round baler to a round baler with an accumulator chamber is disclosed.

10 Claims, 6 Drawing Sheets

ROUND BALER FOR BALING CROP RESIDUE

RELATED APPLICATIONS

This application claims priority to U.S. Provisional Patent Application No. 61/406,574, filed Oct. 25, 2010, which is incorporated by reference herein for all that it teaches.

FIELD OF THE INVENTION

This invention relates to agricultural machines. In particular, this invention relates to harvesting machines.

BACKGROUND OF THE INVENTION

Agricultural machines called balers are provided to gather cut crop material and secure it together in bundles of cut crop material called "bales". In one arrangement, plants are severed in the field and laid down in windrows to dry. These windrows are later lifted off the field by balers and secured into bales. In another arrangement, the crop plants are severed from the ground and are conveyed into a baler, sometimes conveyed directly, sometimes conveyed after some preliminary processing, such as separating grains from the rest of the plant.

It has been proposed recently to attach round and square balers to combines to continuously form, wrap, and eject bales of crop residue as the combine travels through the fields gathering crops.

In one arrangement, shown as several variants in US20110023441A1, US20110023442A1, and US20110023732A1, a round baler is attached to a combine to directly receive material ejected therefrom. The baler has a flat conveyor belt disposed below the chopper of the combine to receive chopped material directly therefrom. The material falls upon the conveyor belt and is conveyed rearward to a feeder (item 196 in the publication) having augers on each end to convey the cut crop material (e.g. MOG) laterally inwardly toward the opening of the baler. This machine is described as a modification to a conventional round baler, such as a Hesston model 5545, 5556, 5556A, or 5546 baler.

In another arrangement, shown in US20030093979A1 a harvester pulls a round baler provided with a hopper for receiving cut crop material. An endless belt conveyor at the bottom of the hopper receives cut crop material from the bottom of the hopper and carries the cut crop material rearward into the baling chamber of the round baler.

In another arrangement, shown in US20080271428A1, a towed round baler is shown having a crop pickup disposed ahead of an accumulator chamber. The crop pickup picks material up off the ground, lifts it up and deposits it into the accumulator, which has an open bottom feeding a conveyor belt that directly feeds the round baler mechanism.

Of the above examples, only the first machine (the '441 publication) is described as being made by incorporating new elements into an existing round baler. These modifications require extensive changes that are time consuming to make, including removal of the existing crop pickup for picking up windrowed crop.

What is needed is a round baler configured to be towed behind a combine for continuously harvesting crop in the field that is more readily and quickly convertible from a standard round baler.

SUMMARY OF THE INVENTION

In accordance with one aspect of the invention, a method of converting a conventional round baler into a modified baler illustrated herein is provided that comprises the step of adding an accumulator chamber to the conventional round baler. The method may also include the step of replacing the tongue of the conventional round baler with an alternative tongue. The method may include the step of mounting a longer power takeoff shaft to the input shaft of the conventional round baler. The alternative tongue may be straight. The alternative tongue may be formed of the original tongue plus a tongue extension. The tongue extension may be mounted to and between the original tongue and the conventional round baler. The alternative tongue may be a forked tongue having a left side fork and a right side fork. The step of adding an accumulator chamber to the conventional round baler may include the step of inserting the accumulator chamber between the left side fork and the right side fork. The method may include the step of coupling an additional ECU to an ECU on the baler or a tow vehicle that is coupled to and tows the converted baler through the field during normal operations. The additional ECU may be connected to an ECU on the baler via a communications link. The communications link may be a serial communications link. The serial communications link may be a CAN bus. The additional ECU may be connected to an ECU on the combine via a communications link. The communications link may be a serial communications link. The serial communications link may be a CAN bus. The additional CPU may be connected to both the ECU on the towing vehicle and the ECU on the baler via one or more communications links. The one or more communications links may be serial communication links. The serial communication links may be CAN busses. The method may include the step of connecting the additional ECU to the towing vehicle ECU (e.g. the combine ECU), to the baler ECU or to both ECUs. The additional ECU may include computer instructions configured to monitor the amount of material in the accumulator chamber. The additional ECU may be coupled to an accumulator fill sensor that indicates the level of crop material in the accumulator. Alternatively the baler ECU 212 may be coupled to an accumulator fill sensor that indicates the level of crop material in the accumulator. The additional ECU may include computer instructions to selectively turn the conveying mechanism on and off. The baler may have one or more adjustable wheels that support the frame of the baler for travel over the ground. A wheel adjustment mechanism may be provided on the baler to raise the baler up and down on its wheels. The method may include the step of raising the baler on its wheels using the adjustment mechanism. Alternatively the method may include the step of attaching an adjustment mechanism between the wheels and the baler to lower or alternatively raise the baler higher in the air. The method may include the step of lifting and supporting a crop pickup above the ground by a crop pickup adjustment mechanism. It may include the step of attaching an elongate trough around a lower portion of the crop pickup. It may include the step of attaching the elongate trough around a lower portion of the crop pickup after the step of lifting and supporting the crop pickup.

In accordance with another aspect of the invention, a method of converting a conventional round baler is provided, the baler having a frame, a baling chamber mounted on the frame, a crop pickup suspended from the frame to gather crop material from the ground, said crop pickup being disposed underneath the baling chamber to convey the gathered crop material toward the baling chamber, a tongue removably fixed to the frame and extending forward from said frame by which the conventional baler may be towed, the method comprising the steps of removing the tongue; replacing the tongue with a replacement tongue; attaching an endless belt conveyor to the baler, wherein the endless belt conveyor has a rear end disposed to convey crop material to the crop pickup; and locating an accumulator chamber on the replacement tongue and above the endless belt conveyor.

The replacement tongue may comprise two forwardly extending and laterally spaced-apart tongue members. The method may comprise the step of locating the accumulator chamber between two forwardly extending and laterally spaced apart members. The method may further comprise the step of coupling the replacement tongue to an agricultural combine to be towed thereby. The method may further comprise coupling a first ECU on the conventional baler to a serial communications bus on the agricultural combine. The method may further comprise the step of coupling a second ECU to the serial communications bus on the agricultural combine. The serial communications bus may be coupled to the endless belt conveyor to transmit control signals to the endless belt conveyor. The method may further comprise coupling a second (i.e. additional) ECU to the first ECU, whereby the serial communications bus is coupled to the first ECU to transmit control signals. The method may further comprise attaching a sensor disposed to sense a level of material in the accumulator chamber to the conventional round baler. The method may further comprise attaching an elongate trough to the crop pickup disposed between the crop pickup and ground. The conventional round baler may comprise wheels for carrying the conventional baler over ground. The conventional round baler may comprise a wheel adjustment mechanism for raising or lowering the baler on its wheels, the method further comprising the step of raising the baler on the wheels with respect to ground using the wheel adjustment mechanism. The baler may comprise wheels for carrying the baler over ground. The method may comprise the step of attaching a wheel adjustment mechanism between the wheels and the frame. The baler may comprise a crop pickup adjustment mechanism. The method may further comprise lifting the crop pickup with respect to ground using the crop pickup mechanism. The method may comprise attaching an elongate trough around a lower portion of the crop pickup after the step of lifting the crop pickup with respect to ground.

DETAILED DESCRIPTION OF THE PREFERRED EMBODIMENTS

Figure 1:
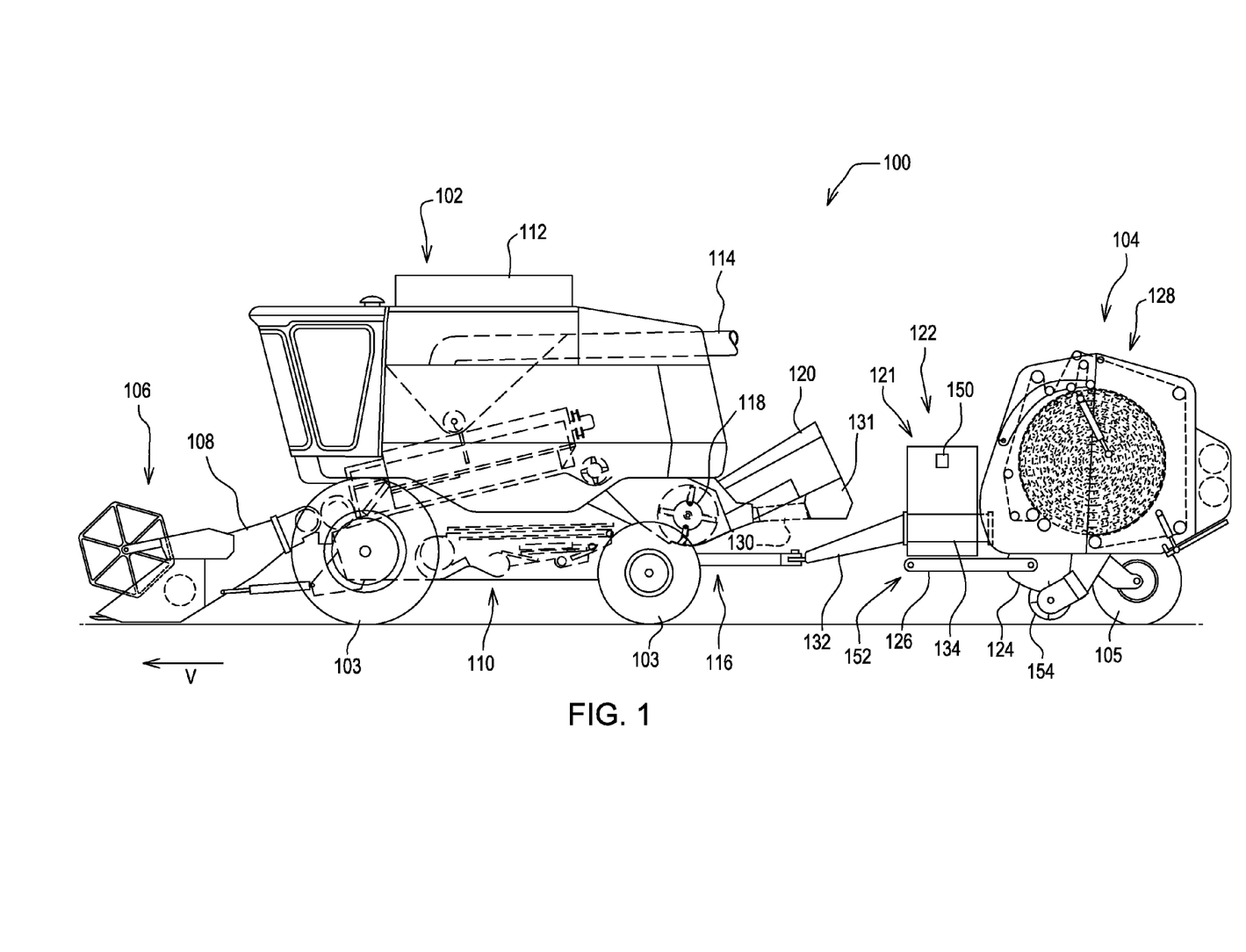
FIG. 1 is a side view of a harvesting machine with converted baler in accordance with the present invention.
Figure 2:
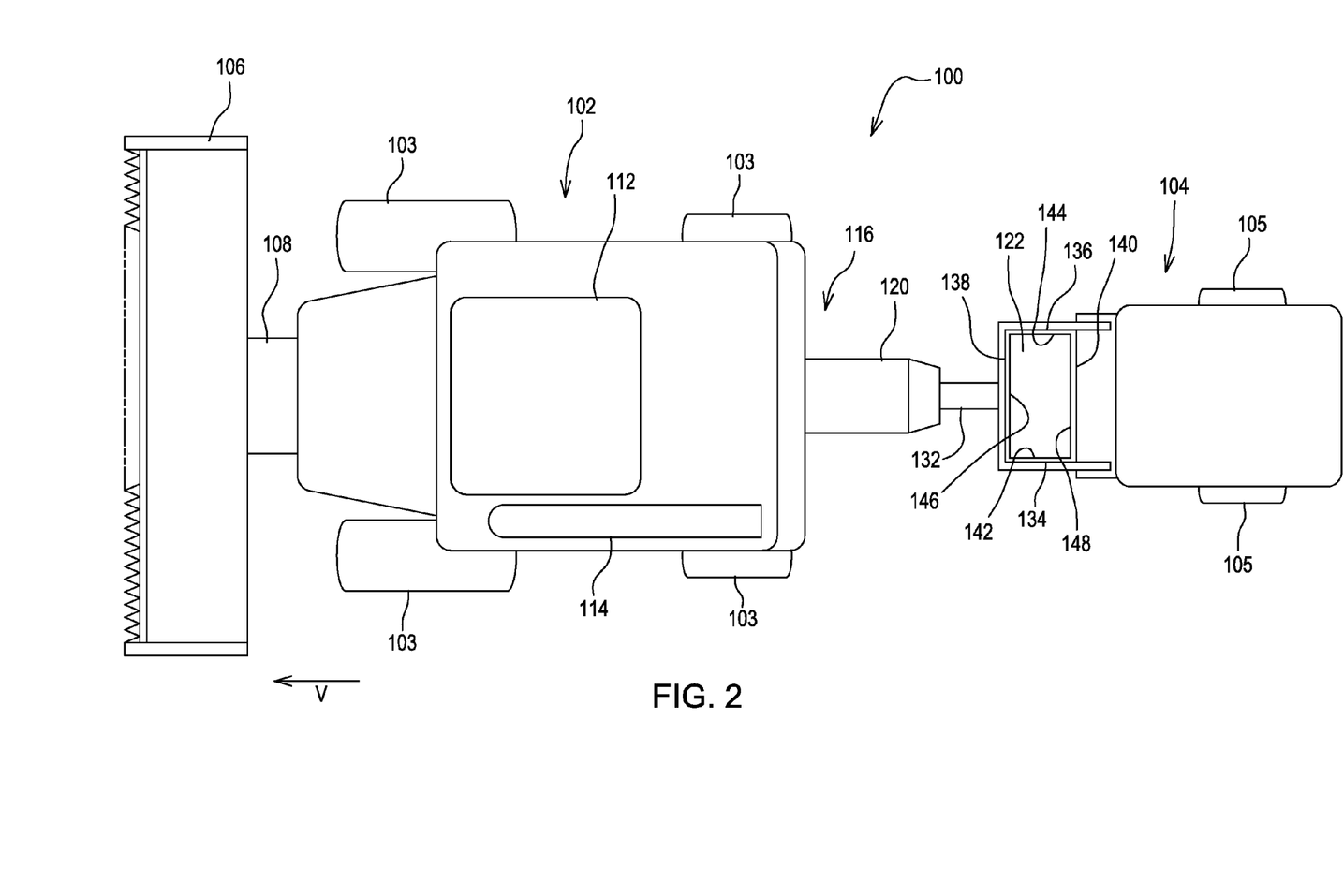
FIG. 2 is a plan view of the apparatus of the foregoing Figure.

Referring to FIGS. 1 and 2, a harvesting machine 100 comprises an agricultural combine 102, supported on wheels 103 and towing a baler 104. The agricultural combine 102 has a header 106 mounted on the front that extends laterally with respect to the direction of travel "V". The header 106 separates portions of the crop plants from the ground and conveys them to a central portion of the header 106. The header 106 is supported on a feederhouse 108 that has an internal conveyor to convey cut crop material from the header 106 to the agricultural combine 102.

Once inside the agricultural combine 102, the cut crop material is processed by a threshing, separating, and cleaning section 110 that threshes, separates and cleans the crop; an elevator (not shown) receives the grain and deposits it in a grain tank 112. The grain is subsequently unloaded by an unloading conveyor 114 into a cart or truck located alongside the agricultural combine 102. Crop material other than grain (MOG) is conveyed to a chopper section 116 comprising a laterally extending chopper rotor 118 generally in the form of a cylinder with a plurality of knives disposed about its circumference. The chopper rotor 118 propels the chopped MOG rearward through a chute 120 that extends rearward from the chopper section 116. Chute 120 directs the crop material rearward through the air behind the agricultural combine 102. The chute 120 is configured to direct the chopped MOG into the open top 121 of an accumulator chamber 122 of baler 104. A MOG diverter mechanism, here shown as a repositionable flow diverter 130 is disposed at the chute 120 to direct some or all of the chopped MOG onto the ground in front of the baler 104 while also transmitting none or some of the chopped MOG up the chute 120, through the air and into the accumulator chamber 122. The chopped MOG leaving the flow diverter is in a relatively compact flow pattern. It is preferable that the diverted chopped MOG be spread evenly over the ground in a relatively wide swath, preferably as wide as the lateral width of the header 106 itself. To spread the flow into a wider swath, the flow diverter is preferably provided with a spreader 131, here comprising several vertical blades or vanes that extend downward into the flow of chopped MOG that has been diverted. Alternatively, spreader 131 may include one or more motors having rotating vanes that engage the chopped MOG and distribute it even more widely over the ground. This is particularly beneficial when the accumulator fills with chopped MOG and further chopped MOG will cause it to overflow onto adjacent part of the baler 104 as discussed below.

Figure 3:
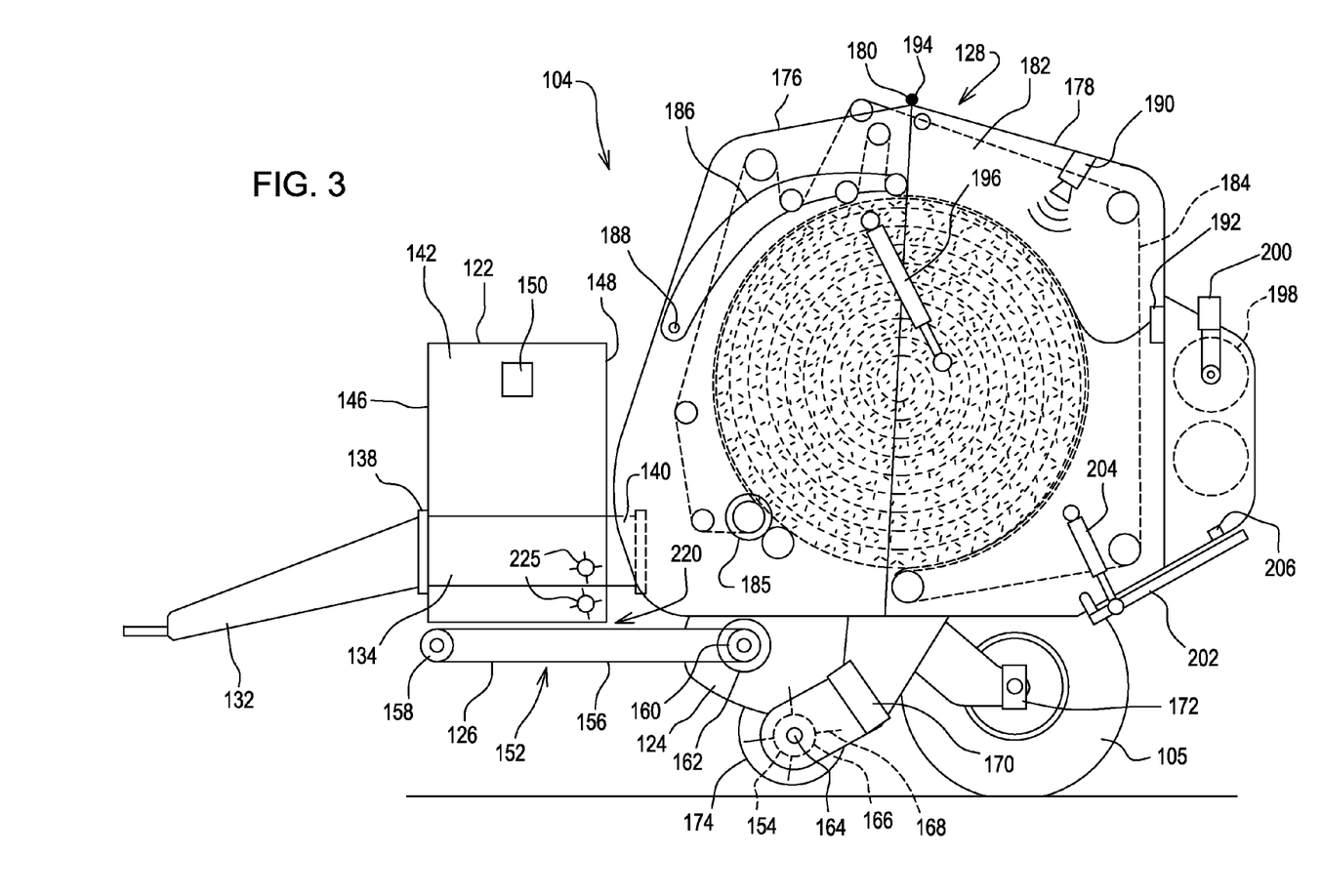
FIG. 3 is a side view of the baler of the foregoing Figures.

Referring to FIGS. 2 and 3, baler 104 has a frame or chassis 124 that supports the accumulator chamber 122, conveying mechanism 126 and baler chamber 128. Baler 104 has a tongue 132 that is coupled to agricultural combine 102 to permit agricultural combine 102 to tow the baler 104, which is disposed immediately behind the agricultural combine 102, through the field. The tongue 132 has a first forward portion that extends back from tongue connection point on the towing vehicle (here shown as agricultural combine 102) until it reaches the accumulator chamber 122, at which point the tongue forks into a first tongue member 134 disposed on the left side of the accumulator chamber 122, and a second tongue member 136 disposed on the right side of the accumulator chamber 122. A laterally extending forward beam 138 is fixed to the forward portion of the tongue 132 and to the front ends of the first tongue member 134 and the second tongue member 136. The rear ends of the first tongue member 134 and the second tongue member 136 are fixed to a laterally extending front crossbeam 140 of chassis 124 to define a box between the first tongue member 134, the second tongue member 136, the laterally extending forward beam 138 and the front crossbeam 140 to define a loop structure into which the accumulator chamber 122 is received and supported.

As part of the process of converting the conventional round baler, the tongue of the round baler is removed and replaced with the tongue shown in the figures herein, the accumulator chamber and its associated components, and the conveying mechanism are attached to conventional round baler as shown herein. A typical tongue for a conventional round baler can be seen in U.S. Pat. No. 5,941,168A.

The accumulator chamber 122 is in the general form of a box with a plurality of sidewalls, and an open top 121. It has a left sidewall 142, a right sidewall 144, a front wall 146 and a rear wall 148. The bottom of the accumulator chamber 122 supports the conveying mechanism 126, here shown as endless belt conveyor 152 to carry crop from the accumulator chamber 122 toward the baler chamber 128. The open top of the accumulator chamber 122 is configured to receive the flow of chopped MOG from the chute 120 during harvesting and baling operations. An accumulator fill sensor 150 is disposed to sense the level and/or amount of material in the accumulator chamber 122 and to generate a signal indicating the level and/or amount of chopped MOG in the accumulator chamber 122.

The conveying mechanism 126 is disposed at the bottom of the accumulator chamber 122 to convey chopped MOG from the accumulator chamber 122 to the baler chamber 128. The conveying mechanism 126 is preferably an endless belt conveyor 152 that extends from the front wall 146 of the accumulator chamber 122 to a point just ahead of a bale chamber feeder, here shown as crop pickup unit 154. The endless belt conveyor 152 includes an endless belt 156 that extends the width of the accumulator chamber 122 and has an exposed top surface area substantially as large as the open bottom of the accumulator chamber 122. The endless belt 156 is supported on a front roller 158 and a rear roller 160 that is coupled to and driven by a conveyor motor 162. The front roller 158 extends laterally substantially the entire width of the accumulator chamber 122 at the front wall 146 of the accumulator chamber 122 and is supported at the left sidewall 142 and right sidewall 144 of the accumulator chamber 122. The rear roller 160 is supported on the chassis 124 at a location rearward of the rear wall 148 of the accumulator chamber 122. The rear roller 160 extends laterally substantially the entire width of the accumulator chamber 122 and is disposed forward of and immediately adjacent to the crop pickup unit 154.

Crop pickup unit 154 includes a tined rotor device comprising an elongate shaft 164 on which wire wheels 166 are severally fixed for rotation about a rotor axis defined by the shaft 164. The wire wheels 166 that are spaced apart from one another along the lateral length of the elongate shaft 164. Each wire wheel has a plurality (preferably four to six) wire tines 168 extending radially therefrom that are spaced evenly about the periphery of the wire wheel. The wire wheels 166 of the tined rotor device are disposed to receive crop falling from the rear end of the endless belt 156. The crop pickup unit 154 may be supported on a crop pickup adjustment mechanism 170. The crop pickup adjustment mechanism 170 may comprise a manual adjuster, or comprise a powered adjuster such as a motor, or both. The crop pickup adjustment mechanism 170 is coupled to the crop pickup unit 154 in order to raise or lower the crop pickup unit 154 with respect to the chassis 124 of the baler 104. In alternative conventional round balers, the crop pickup unit is supported on crop pickup wheels disposed at either side of the crop pickup unit. As the crop pickup wheels roll over the ground rising and falling with terrain changes they lift and lower the crop pickup unit disposed between them so it also follows the ground terrain. In arrangements such as this, the crop pickup adjustment mechanism is disposed between the crop pickup unit wheels and the remainder of the crop pickup unit.

Wheels 105 are coupled to the chassis 124 to support the baler 104 for travel over the ground as it is towed by the agricultural combine 102. The wheels are supported on the chassis 124 on a wheel adjustment mechanism 172 which is configured to permit the operator to raise and lower the wheels with respect to the chassis 124 and to fix the wheels in the various positions. The wheel adjustment mechanism 172 may comprise a manual adjuster or a powered adjuster such as a motor, or both. This wheel arrangement, either by adjustment of the wheel adjustment mechanism 172 or by adjustment of the crop pickup adjustment mechanism 170, or by adjustment of both, thereby permit the operator to raise or lower the crop pickup unit 154 to any predetermined operating height with respect to the chassis 124 and with respect to the ground that the operator desires.

A trough 174 is mounted underneath the crop pickup unit 154 to receive chopped MOG that would otherwise fall through the spaces between the wire wheels 166 and onto the ground. This trough 174 also protects the wire tines 168 of the wire wheels 166 from engaging and gathering any material resting on the ground. The trough 174 has an inside surface formed at a curvature slightly greater than, and disposed adjacent to, a lower half of an envelope defined by the tips of the wire tines 168 as they rotate about the elongate shaft 164, thereby allowing a slight clearance between the curved inner surface of the trough 174 and the outermost rotating parts of the crop pickup unit 154.

Referring to FIG. 3, the baler 104 comprises a front shell 176 and a rear shell 178 that are hinged at a hinge joint 180 located along the top of the baler chamber 128. The front shell 176 and the rear shell 178 when hinged to the closed position shown in FIG. 3 in solid lines, form the hollow bale chamber in which the round bale is formed. Crop material falling from the endless belt conveyor 152 is projected onto the wire tines 168 of the wire wheels 166, which rotate in a direction to lift the chopped MOG. The chopped MOG is moved upward and into the central cavity 182 defined by the front shell 176 and the rear shell 178. An array of endless conveyor belts 184 driven by a belt motor 185 are disposed about the interior of the baler chamber 128 to receive the chopped MOG in the form of an elongate ribbon having a width substantially the same as the interior width of the baler chamber 128. A belt tensioner, here shown as an arm 186 is disposed to ride against the upper surface of the round bale as it is formed, pivoting upward as the bale increases increase in size. A first bale size sensor 188 is coupled to the arm 186 and generates a signal indicative of the bale size as the growing round bale moves the arm 186 upward. A second bale size sensor 190 includes a retro reflective device or a light, sound or electromagnetic transmitter/receiver pair that also generates a signal indicative of the bale size A third bale size sensor 192 is responsive to physical characteristics of the bale, such as its capacitance or resistance, and also generates a signal indicative of the bale size. Any one or all of the first bale size sensor 188, the second bale size sensor 190 or the third bale size sensor 192 can be employed to generate a signal indicative of the bale size. A shell position sensor 194 is responsive to the relative positions of the first shell and the second shell and generates a signal indicative of the degree of opening (which may include the closed or open state) of the front shell 176 and the rear shell 178. At least one actuator, preferably hydraulic or electrically driven, is employed as a shell opener 196 and is coupled to and between the front shell 176 and the rear shell 178. The shell opener 196 serves to open and close the shells about the hinge joint 180. A reel 198 of winding material, such as plastic film, binder twine or plastic mesh is supported at the rear of the baler 104. A wrap actuator 200 is coupled to the reel 198 and serves to engage the winding material with the round bale. Once the wrap actuator 200 has engaged the material, the endless conveyor belts 184 roll the round bale and cause the winding material to wrap around and secure the round bale. A rear gate 202 extends across the back of the baler 104 just behind the rear shell 178 and, when lowered to the ground by gate actuator 204, functions as a ramp to ease the transition of the round bale to the ground when the round bale is ejected. It also serves to crush the residual crop plant stalks (such as corn stalks) from which the chopped MOG was cut and over which the agricultural combine 102 and baler 104 pass that might otherwise rupture the winding material and permit rainwater or insects to contaminate the round bale. A gate sensor 206 is disposed to sense the position of rear gate 202 with respect to the ground and/or the chassis 124. It provides a signal indicative of the rear gate 202 position, which may include the position in which the rear gate 202 is lowered to the ground and/or is raised above the ground to a position at which it does not interfere with the plant stalks.

The baler 104 may be provided with a control system for controlling the operation of the baler 104 from the cab of the agricultural combine 102 during harvesting operations. Balers are historically towed by farm tractors and gather crop previously deposited on the field in windrows. In these operations the operator is preoccupied with a single task: baling the hay in the windrow. This occupies his full attention and he can perform such maneuvers as steering the tractor from side to side to insure the baler 104 is making a bale with an even diameter across its width. This can be difficult if the windrow the operator is picking up meanders over the field from one side to another and the tractor follows it. Nonetheless, since the operator is at the wheel of the tractor he can look backward through the rear window of the tractor cab and monitor the baling process. Simple controls are all that are necessary.

If there is any reason for a more careful inspection, the operator can stop the tractor, climb off, go to the baler 104 and inspect it more carefully. Unfortunately, the operator of the harvesting machine 100 disclosed herein does not have the time or the focus to monitor the baler 104 due to the demands of operating the agricultural combine 102 itself. Nor can the operator stop the agricultural combine 102 with any regularity to inspect the baler 104.

Unfortunately, the operator has no rear window in the agricultural combine 102 through which he can see the baler 104. In the harvesting and baling machine described herein, therefore, the baler 104 must operate much more autonomously and must provide the operator with more data than previously designed in order to support the combined harvesting and baling operations proposed herein. For that reason, an additional array of electronic sensors (including those described above) and electronic control units (ECUs) on the baler 104 and the agricultural combine 102 are desirable to permit the operator to stay focused and efficient.

In the discussion herein, reference is made to operator input devices, displays, sensors, driver circuits, communication links and electronic control units (ECUs). The electronic control units may comprise digital microcontrollers, digital microprocessors, and/or discrete digital logic circuits. An ECU may be identified as performing a particular function in the discussion below. It should be understood that the functions can be distributed between one or more ECUs in any fashion, even differently than that set forth in the description below.

In the discussion herein, a single ECU may be described as performing several functions. It should be understood that although a single ECU is described as performing a function below, several ECUs can be substituted for that single ECU, wherein each of the substituted ECUs performing one or more of the functions.

In the description herein, the ECUs are described as having communication links to another ECU or ECUs in order to share information and coordinate their control and monitoring activities. Using current technology, wired serial digital communications links are most preferred, more preferably CAN bus communications, and more preferably CAN bus communications following the SAE J1939 standard. The communications links need not be so configured, however. Other configurations of the communications links may be preferred such as wireless communications based on cell phone communications, Bluetooth, WIFI, MIFI, WAN, LAN, vehicle area network, or controller area network protocols and circuits are equally useful for providing the communications.

Figure 4:
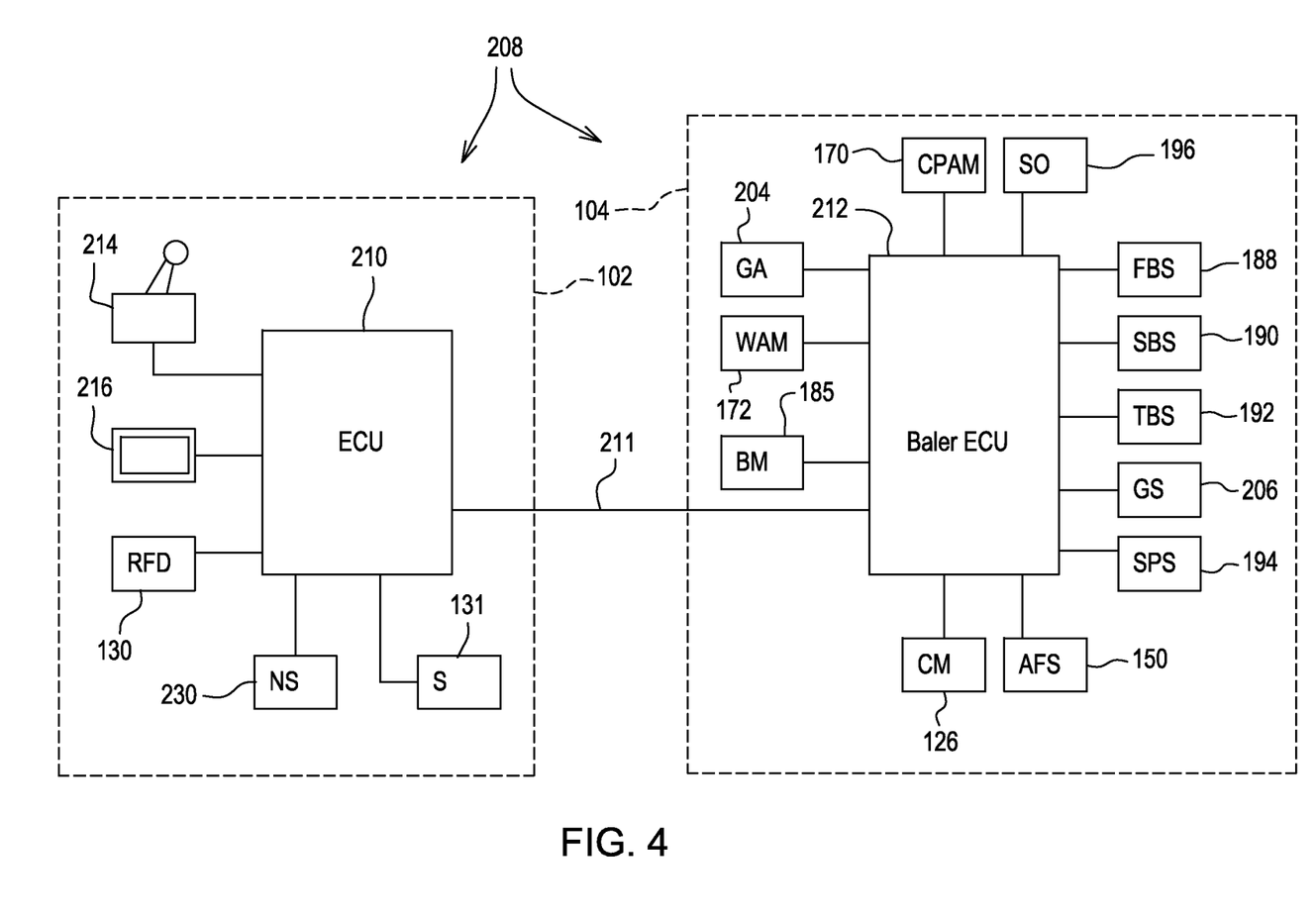
FIG. 4 is a schematic diagram of a control system of the apparatus of the foregoing Figures.

FIG. 4 illustrates an electronic control system 208 for the harvesting machine 100 of the foregoing figures. This electronic control system 208 includes combine ECU 210 that is electronically coupled to baler ECU 212 to control and monitor the baler 104. A first operator input device 214 is coupled to the combine ECU 210 to permit the operator to send commands to the combine ECU 210 and electronic control system 208 while operating the vehicle. An operator display 216 is coupled to the combine ECU 210 to permit the electronic control system 208 to signal the operator of a condition requiring his attention. The operator display 216 is configured to provide visual indicia of harvesting machine 100 states described in greater detail herein. The operator display 216 is preferably disposed in front of the operator when the operator is facing forward during harvesting. The first operator input device 214 is also preferably located inside the operator cabin of the agricultural combine 102 and is preferably within reach of the operator when the operator faces forward during normal harvesting operations. The first operator input device may include one or more switches, levers, knobs, dials, buttons, touch screens, and touchpads that are configured to provide their data to the combine ECU 210.

The first bale size sensor 188, and/or the second bale size sensor 190, and/or third bale size sensor 192, the gate sensor 206, the shell position sensor 194, and the accumulator fill sensor 150, are connected to the baler ECU 212. The baler ECU 212 is configured to read signals generated by the censors and process them as described herein. The crop pickup adjustment mechanism 170, wheel adjustment mechanism 172, gate actuator 204, conveying mechanism 126, and shell opener 196 are coupled to the baler ECU 212, which is configured to selectively drive these devices as described herein.

The electronic control system 208 is configured to monitor the first bale size sensor 188, and/or the second bale size sensor 190, and/or third bale size sensor 192, the gate sensor 206, the shell position sensor 194, the accumulator fill sensor 150, and the first operator input device 214 and is configured to drive the crop pickup adjustment mechanism 170, wheel adjustment mechanism 172, gate actuator 204, conveying mechanism 126, and shell opener 196 in the manner described herein.

To first start the baler in operation, the operator manipulates the first operator input device 214. This manipulation causes the combine ECU 210 to transmit a signal over the communications link 211 to the baler ECU 212, instructing the baler to start its operation. In response, the baler ECU signals the belt motor 185 and the crop pickup unit to begin operating. The baler ECU 212 then determines whether the belt motor 185 and the crop pickup unit 154 are operating at a sufficient predetermined speed, and if they are, it then signals the endless belt conveyor 152 (e.g. signals the conveyor motor 162) to begin conveying crop from the accumulator chamber 122 to the baler chamber 128.

Endless belt conveyor 152 draws MOG from the bottom of the accumulator chamber forward and into a narrow and laterally extending aperture 220 (see FIG. 3) disposed between an upper feed regulator 225 in the form of a laterally extending roller having tines or spokes extending outward therefrom that are distributed along its length. The upper feed regulator 225 conveys material upward away from the surface of the endless belt conveyor. Excess crop material resting on top of the endless belt conveyor 152 is stripped from the top surface of the endless belt conveyor 152 by the upper feed regulator and is conveyed upwards. This counter rotating movement of the upper feed regulator (clockwise in FIG. 3) reduces the amount of material pulled into the laterally extending aperture defined by the bottom of the rear wall 148 and the top surface of the endless belt of endless belt conveyor 152. This tends to reduce the jamming of endless belt conveyor 152.

The baler ECU 212 continuously monitors the size of the bale using one or more of the first bale size sensor, the second bale size sensor, and the third bale size sensor. At some point as the bale increases in size, the size sensors eventually transmit a signal indicating that the bale has reached a predetermined size. The baler ECU 212 as part of its continuous monitoring process compares the signals provided by the bale size sensors with a predetermined value. When the bale size reaches the predetermined value as indicated by this comparison, the baler ECU 212 branches to a series of instructions that perform the bale wrapping and ejection process. First, the baler ECU signals the conveying mechanism to halt. This prevents any additional MOG from being introduced into the baling chamber during the wrapping process. At substantially the same time, the baler ECU 212 signals the wrap actuator to attach the winding material on reel 198 to the bale. The endless conveyor belts 184 driven by belt motor 185 rotate the bale, causing the bale to become wrapped with the winding material from reel 198. The baler ECU 212 terminates this wrapping process when the winding material has been wrapped around the bale a predetermined number of degrees. The baler ECU 212 then signals the shell opener 196 to hingedly lift rear shell 178 with respect to front shell 176 about hinge joint 180. The baler ECU 212 substantially simultaneously signals gate actuator 204 to lower the rear gate 202. Since the baler is still being drawn through the field, the lowered gate is close enough to the ground to bend and break the plant stalks (such as corn stalks) passing underneath the gate and thereby provides a more even, and level surface that is less likely to compress or damage the winding material wrapped around the bale when the bale is ejected onto the ground. With the gate lowered, the wrapped bale rolls down the lowered gate and onto the ground where it stops as the baler continues on through the field.

Having ejected the wrapped bale, the baler ECU 212 then returns the baler to normal baling operations. The baler ECU 212 is configured to signal the gate actuator to raise the rear gate. Eventually, the rear gate reaches its lifted position, and actuates the gate sensor 206. The baler ECU 212 monitors the gate sensor 206 after it has signaled the gate actuator to lift the rear gate, and turns off the gate actuator when the rear gate is again lifted. The baler ECU 212 then signals the shell opener 196 to lower the rear shell 178. The baler ECU 212 monitors the signal provided by the shell position sensor. When the shell position sensor indicates to the baler ECU 212 that the rear shell has returned to its baling position, the baler ECU 212 is configured to turn the belt motor 185 on and begin driving endless conveyor belts 184. When the endless conveyor belts 184 have again returned to their operating speed, the baler ECU 212 is configured to signal the endless belt conveyor 152 (i.e. to signal the conveyor motor 162 that drives endless belt conveyor 152) to begin operating and carrying crop from the accumulator chamber to the baler chamber.

The baler ECU 212 is configured to continually monitor the amount (typically the height or weight) of chopped MOG inside the accumulator chamber using the accumulator fill sensor 150. The accumulator fill sensor 150 generates a signal indicative of the amount of chopped MOG filling the accumulator chamber. The baler ECU 212 reads the signal generated by the accumulator fill sensor 150 and compares it against a predetermined value to determine whether the amount of chopped MOG filling the accumulator chamber has reached a predetermined amount. This predetermined amount may be selected to prevent the baler overall from weighing too much, or to prevent the accumulator chamber from overflowing. Alternatively, it may be selected as an indication of whether the baling process should be speeded up, such as by increasing the speed of the endless belt conveyor 152 or by increasing the speed of the endless conveyor belts 184, or both.

While the accumulator fill sensor 150 is described as being connected to baler ECU 212, which connection is made during the conversion process when accumulator chamber 122 is added to the conventional round baler, the accumulator fill sensor 150 may also be connected to the additional ECU, the addition of such an ECU may also be a step in the conversion process as described above.

In any event, when the baler ECU 212 determines that the amount of chopped MOG in the accumulator chamber has reached a predetermined level, it is configured to signal the combine ECU 210 (over the communications link joining the baler ECU 212 and the combine ECU 210) to signal repositionable flow diverter 130 to redirect the flow of chopped MOG over the ground. In this manner, any excess chopped MOG is not deposited in piles or heaps on the ground as it overflows the accumulator chamber 122, but is distributed evenly over the ground behind the combine where it can more easily become compost. Alternatively, the combine operator when harvesting on level ground may wish to have a certain minimal amount of chopped MOG spread on the ground in order to reduce erosion. In this arrangement, the operator can manipulate the first operator input device to select a desired rate of spreading. In this arrangement, the combine ECU 210 is configured to directly control the repositionable flow diverter 130 at the command of the operator in the cab, and carry any excess chopped MOG through the chute and into the accumulator chamber for baling. This arrangement permits the operator to bale and spread varying portions of the chopped MOG at his command. Further, the combine ECU 210 may comprise a terrain map in its digital memory that further comprises a prescription of the amount of chopped MOG to be distributed over the ground at each two-dimensional location of the harvesting machine 100. The combine ECU 210 may also be coupled to a navigation system 230, such as a GPS, to provide an indication of the position of the harvesting machine 100. In this mode of operation, the combine ECU 210 is configured to periodically and repeatedly compare the vehicle location derived from the navigation system 230 with the terrain map, and automatically calculate an appropriate amount of chopped MOG to spread over the ground, and to adjust the position of the repositionable flow diverter 130 to direct this amount of chopped MOG over the ground automatically without operator intervention, and to direct the remainder of the chopped MOG into the accumulator chamber of the baler. The two functions of preventing the overflow of the accumulator chamber with chopped MOG, and applying an appropriate amount of chopped MOG over a field based upon a terrain map can be incorporated in the same computer instructions that are stored in and executed by the combine ECU 210. In this manner, the system is configured to distribute a predetermined and varying amount of chopped MOG over the surface of an agricultural field during the harvesting that is a function of the location of the harvesting machine in the agricultural field without operator intervention at the same time. By combining the functions, the system can automatically prevent overflows of the accumulator chamber at the same time by having the combine ECU 210 command the position of the repositionable flow diverter such that it overrides the amount to be spread indicated by the terrain map.

The operator is provided with an indication of the status of the harvesting machine as the harvesting machine proceeds through the field. This status indication is generated by the combine ECU 210, which transmits signals to the operator display commanding it to energize certain visual indicia that are observable by the operator.

Figure 5:
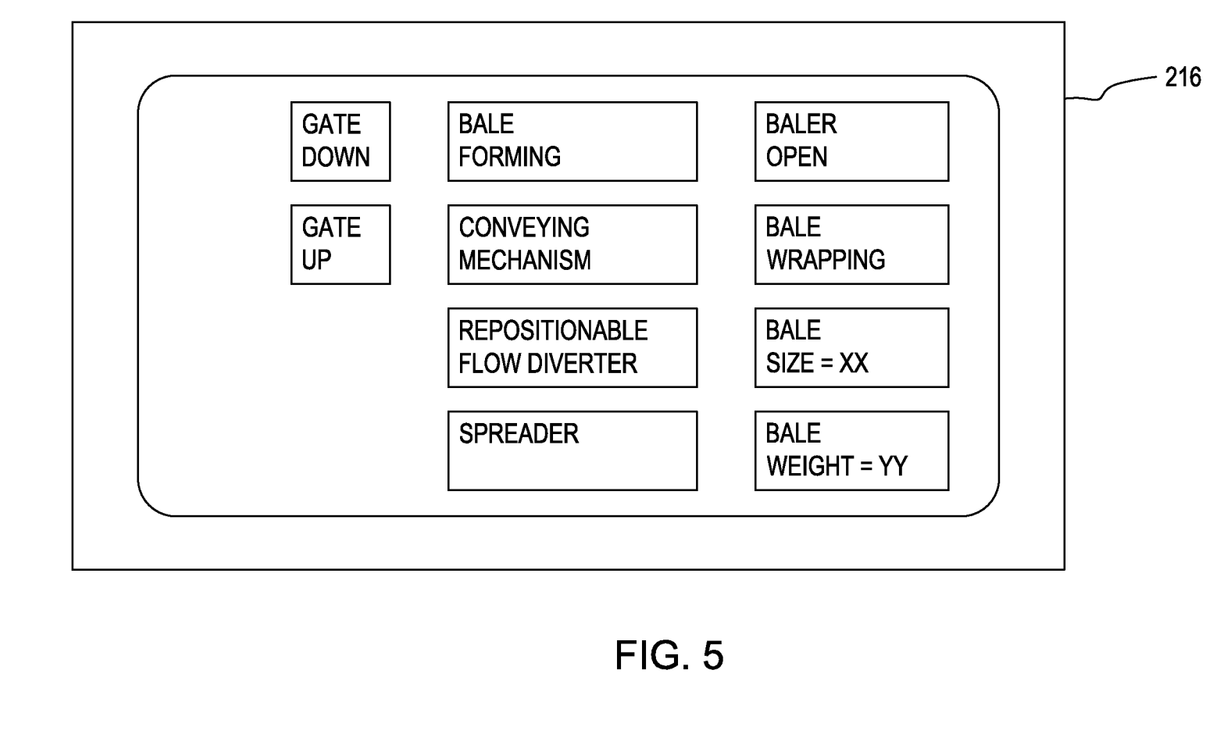
FIG. 5 is a screen view of a display screen of the apparatus of the foregoing Figures.

Referring now to FIG. 5, the operator display is shown with a plurality of visual indicia indicating the status of the harvesting machine. The combine ECU 210 signals a first indicia "Baler Open", on the operator display when the shell position sensor indicates that the rear shell is not completely closed. The combine ECU 210 signals the second indicia "Bale Wrapping" whenever the baler ECU 212 indicates over the communications link that it is going through the baler wrap cycle. The combine ECU 210 signals a third indicia "Bale Size=XX" and indicates the changing baler size as a numeric value in place of the label "XX". The combine ECU 210 signals a fourth indicia: "Bale Weight=YY" in which "YY" is a calculated numeric bale weight. The combine ECU 210 signals a fifth indicia "Bale Forming" whenever the baler chamber is receiving chopped MOG from the accumulator chamber and is forming a bale. The combine ECU 210 signals a sixth indicia: "Conveying Mechanism" whenever the conveying mechanism is running. The combine ECU 210 signals a seventh indicia: "Repositionable Flow Diverter" whenever the flow diverter is diverting a predetermined amount of chopped MOG. The combine ECU 210 signals an eighth indicia "Spreader" whenever the spreader 131 is enabled to spread the diverted chopped MOG over the ground. This occurs when the motor of a spreader 131 is energized and rotating. The combine ECU 210 signals a ninth indicia: "Gate" whenever the baler ECU 212 determines from the gate sensor that the gate is in its completely raised position—the position it assumes when a bale is being formed. The baler ECU 212 is configured to transmit the state of the gate to the combine ECU 210, which in turn, displays this state on the operator display. The combine ECU 210 signals a tenth indicia: "Gate Down" from the gate sensor that the gate is in its lowered position—the position it assumes when a bale is being ejected. The status information of the harvesting machine that is displayed on the operator display that is described above, is generated by the baler ECU 212 and is transmitted to the combine ECU 210 which further processes the status information and signals the corresponding indicia on the operator display.

FIG. 4 illustrates one embodiment of the control system for the combine+baler vehicle. In the FIG. 4 arrangement, the conventional baler was modified by connecting the conveying mechanism 126 (i.e. the conveyor motor 162 that drives endless belt conveyor 152) and the accumulator fill sensor 150 to the baler ECU 212 of the conventional baler so the baler ECU 212 can drive the motor and monitor the level of fill in the accumulator chamber 122. As mentioned above, the conventional round baler can also be modified by adding a second, additional ECU. This second ECU can be connected directly to the baler ECU 212 via a communications link or to the combine ECU 210 via a communications link.

Figure 6:
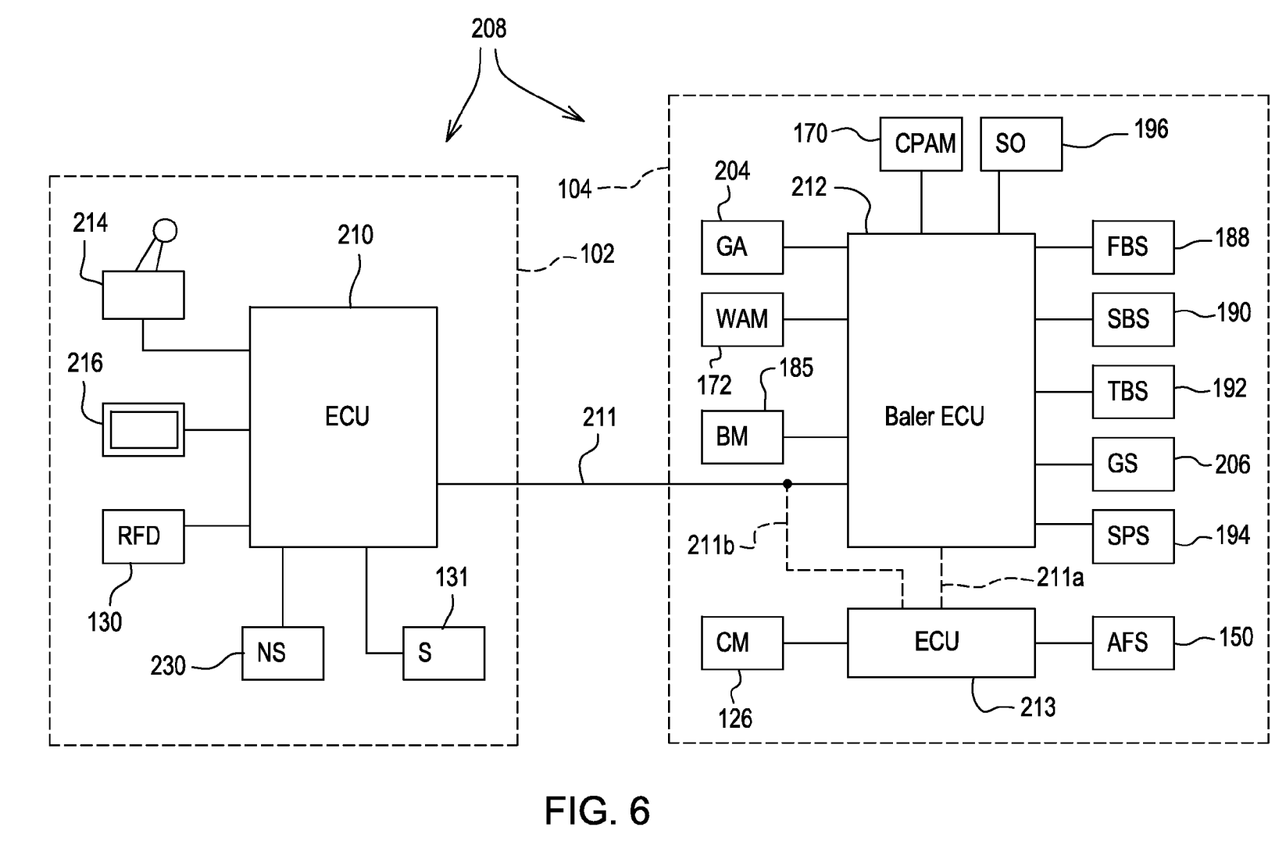
FIG. 6 is a schematic diagram of an alternative arrangement of the ECUs and devices of the foregoing Figures.

This arrangement is illustrated in FIG. 6 in which the combine ECU 210 is connected to the baler ECU 212 via communication link 211 as described above, and the additional ECU 213 is connected to the baler ECU 212 via a communications link 211*a*, or alternatively to the combine ECU 210 via communications link 211*b*. The conveying mechanism 126 (i.e. the conveyor motor 162 of endless belt conveyor 152) and the accumulator fill sensor 150 are connected to the additional ECU 213 instead of connected directly to baler ECU 212. In the arrangement of FIG. 6, the functions of the system are the same as described above. The only difference is the number and ways the ECUs are connected to each other and to the conveying mechanism 126 (i.e. to the conveyor motor 162 that drives the conveyor), and the accumulator fill sensor 150.

At least one advantage of providing an additional ECU coupled to the conveying mechanism and the accumulator fill sensor mounted on the tongue is to provide additional processing power for the additional functions necessitated by the additional components added to the conventional round baler. These additional functions include the operation of the conveying mechanism and the monitoring of the accumulator level sensor.

The invention claimed is:

1. A method of converting a conventional round baler for receiving harvested crop material directed rearward from a harvesting machine provided with a diverter which is selectively operable for diverting onto the ground crop material directed toward an accumulator, the round baler having a frame, a baling chamber mounted on the frame, a crop pickup suspended from the frame and having a tined rotor device mounted for rotation about a rotor axis for gathering crop material from the ground and being disposed underneath the baling chamber to convey the gathered crop material toward the baling chamber, a tongue removably fixed to the frame and extending forward from said frame by which the conventional round baler may be towed, the method comprising the steps of:

replacing the tongue with a replacement tongue and connecting the replacement tongue to the harvesting machine;

attaching a rear end of an endless belt conveyor to the baler at a location vertically above the tined rotor device of the crop pickup, whereby the tined rotor device is disposed to receive crop falling from the rear end of the endless belt conveyor;

locating the accumulator chamber on the replacement tongue and above the endless belt conveyor for receiving crop material directed toward the baler from the harvesting machine;

attaching a sensor disposed to sense a level of crop material in the accumulator chamber; and operating said diverter for diverting onto the ground crop material directed toward the accumulator chamber from the harvesting machine in response to a predetermined sensed level of crop material.

2. The method of claim 1, wherein the replacement tongue includes two forwardly extending and laterally spaced apart tongue members, the method further comprising the step of locating the accumulator chamber between the two forwardly extending and laterally spaced apart tongue members.

3. The method of claim 1, wherein the harvesting machine is an agricultural combine and the method of converting further comprises the steps of:

coupling a first ECU on the conventional round baler to a serial communications bus on the agricultural combine.

4. The method of claim 3, further providing the step of coupling a second ECU to the serial communications bus on the agricultural combine and to the endless belt conveyor to transmit control signals to the endless belt conveyor.

5. The method of claim 3, further comprising the step of coupling a second ECU to the first ECU, whereby the serial communications bus is coupled to the first ECU to transmit control signals.

6. A method of converting a conventional round baler for receiving harvested crop material directed rearward from a harvesting machine, the round baler having a frame, a baling chamber mounted on the frame, a crop pickup suspended from the frame and having a tined rotor device mounted for rotation about a rotor axis for gathering crop material from the ground and being disposed underneath the baling chamber to convey the gathered crop material toward the baling chamber, a tongue removably fixed to the frame and extending forward from said frame by which the conventional round baler may be towed, the method comprising the steps of:

replacing the tongue with a replacement tongue and connecting the replacement tongue to the harvesting machine;

attaching a rear end of an endless belt conveyor to the baler at a location vertically above the tined rotor device of the crop pickup, whereby the tined rotor device is disposed to receive crop falling from the rear end of the endless belt conveyor;

locating an accumulator chamber on the replacement tongue and above the endless belt conveyor;

attaching an elongate trough, having an inside surface having a curvature slightly greater than that of an envelope defined by the tips of tines of the tined rotor, to the crop pickup so as to be disposed between the crop pickup and ground at a location for receiving any crop delivered by the belt conveyor which passes through the tined rotor device and would otherwise fall onto the ground.

7. The method of claim 1, wherein the conventional round baler comprises wheels for carrying the conventional round baler over the ground, and a wheel adjustment mechanism for raising or lowering the baler on its wheels, the method further comprising the step of raising the baler on the wheels with respect to the ground using the wheel adjustment mechanism.

8. The method of claim 1, wherein the conventional round baler comprises wheels for carrying the conventional round baler over the ground, the method further comprising the step of attaching a wheel adjustment mechanism between the wheels and the frame.

9. The method of claim 1, wherein the conventional round baler further comprises a crop pickup adjustment mechanism and the method further comprises lifting the crop pickup with respect to the ground using the crop pickup adjustment mechanism.

10. A method of converting a conventional round baler for receiving harvested crop material directed rearward from a harvesting machine, the round baler having a frame, a baling chamber mounted on the frame, a crop pickup suspended from the frame and having a tined rotor device mounted for rotation about a rotor axis for gathering crop material from the ground and being disposed underneath the baling chamber to convey the gathered crop material toward the baling chamber, a tongue removably fixed to the frame and extending forward from said frame by which the conventional round baler may be towed and a crop pickup adjustment mechanism, the method comprising the steps of:

replacing the tongue with a replacement tongue and connecting the replacement tongue to the harvesting machine;

attaching a rear end of an endless belt conveyor to the baler at a location vertically above the tined rotor device of the crop pickup, whereby the tined rotor device is disposed to receive crop falling from the rear end of the endless belt conveyor;

locating an accumulator chamber on the replacement tongue and above the endless belt conveyor;

lifting the crop pickup with respect to the ground using the crop pickup adjustment mechanism; and attaching an elongate trough around a lower portion of the tined rotor device of the crop pickup after the step of lifting the crop pickup with respect to the ground.

* * * * *